United States Patent [19]

Airhart

[11] 4,073,363
[45] Feb. 14, 1978

[54] METHOD AND APPARATUS FOR GENERATING A LONG SEQUENCE OF SEISMIC PULSES

[75] Inventor: Tom P. Airhart, Plano, Tex.

[73] Assignee: Atlantic Richfield Company, Los Angeles, Calif.

[21] Appl. No.: 751,407

[22] Filed: Dec. 16, 1976

[51] Int. Cl.² .............................................. G01V 1/12
[52] U.S. Cl. ................................. 181/117; 181/107; 227/9
[58] Field of Search ................... 181/117, 118, 107; 227/9

[56] References Cited

U.S. PATENT DOCUMENTS

| 3,055,450 | 9/1962 | Richards | 181/118 |
| 3,338,330 | 8/1967 | Chatenever | 181/117 |
| 3,545,562 | 12/1970 | Gundlach | 181/117 |
| 3,620,327 | 11/1971 | Savit | 181/118 |
| 3,860,087 | 1/1975 | Silverman | 181/117 |

Primary Examiner—Howard A. Birmiel
Attorney, Agent, or Firm—Robert M. Betz

[57] ABSTRACT

Within the stationary, upstanding cylindrical housing of a rapid fire seismic gas exploder an expansible detonation chamber is formed between a base resting on the earth and a piston adapted to move reciprocally. A plurality of separate external gas entry conduits communicate with the detonation chamber at spaced apart inlets in the wall of the housing. Each conduit is supplied from its own separate gas mixer which in turn is interconnected with sources of fuel gas and oxidizing gas through a pair of remotely operable flow control valves. As the pairs of control valves are actuated in timed sequence at a desired rate of fire, successive charges of combustible gas mixture are injected into the detonation chamber, utilizing one mixer and its associated gas entry conduit at a time. Correspondingly timed spark ignition is provided in or adjacent each mixer, resulting in a series of gas explosions in the chamber which coordinates with the reciprocal movement of the piston. By increasing the number of these separate mixer-conduit combinations, a rapid-fire shot sequence of any practical length can be achieved without preignition.

13 Claims, 2 Drawing Figures

METHOD AND APPARATUS FOR GENERATING A LONG SEQUENCE OF SEISMIC PULSES

BACKGROUND OF THE INVENTION

1. Field of the Invention

This invention relates generally to the field of gas exploders adapted to rest on the earth and deliver one or more seismic compressional pulses into the earth. The invention is more particularly concerned with exploders of this character which are fired repeatedly at very short intervals.

2. Description of the Prior Art

Seismic gas exploders or as they are sometimes termed, seismic wave generators, broadly speaking, include a detonation or combustion chamber having a rigid bottom adapted to rest on the earth and a rigid top telescopically or otherwise joined therewith in a suitable fashion to permit relative vertical movement therebetween. Initiation of the explosion of a combustible fuel gas and oxidizing gas mixture within the chamber produces the desired relative movement and applies a compressional pulse to the earth through the rigid bottom of the chamber.

Normally, fuel gas and oxygen from separate containers are mixed prior to being conducted into the detonation chamber in correct proportions by means of flow controlling solenoid valves interposed between the separate containers and the mixing point. Upon closing of the solenoid valves, the combustible gas mixture is ignited by a spark source located at the point of mixing. The resulting combustion accelerates into a detonation front within the inlet pipe or conduit leading to the exploder's detonation chamber.

The heat generated by the chemical reaction involved in the burning and detonation of such a gas mixture does not of course dissipate immediately. If a gas exploder is fired repetitively at a rapid rate, one of the barrier problems is ignition of gases during fill prior to activation of the spark source, i.e. preignition. The higher the rate of fire, the sooner this limitation is manifested. In practicing modern seismic data acquisition techniques, it is desirable to be able to generate long pulse sequences, ranging, for example, up to 100 or 200 pulses. For this and other reasons, therefore, the problem of preignition has assumed greater importance.

Premature ignition may be the result of several factors including but not necessarily limited to: (1) residual heat stored in the walls of the exploder, inlet conduit or mixed-spark ignition assembly, (2) residual flame due to combustion of gases not burned in the detonation front (to be distinguished from failure of solenoid valves to close completely, resulting in a sustained flame), (3) heat released by carbon in gas form converting to solid form, (4) glowing particles adhering to walls of the exploder and inlet, and (5) hot spots at localized points due to detonation and subsequent shock waves.

The prior art has recognized the existence of the preignition problem; but so far as Applicant is aware, it has assumed that among the factors mentioned above the main contributor has been the buildup of heat within the detonation chamber itself. Thus, for example, exhaust valving arrangements have been devised more efficiently to release the spent gases from the explosion. This approach has met with little success.

Applicant has, by contrast, focused his attention outside the detonation chamber. It is hypothesized that since the flame or combustion front is initiated in or adjacent to the external mixer and accelerated therefrom toward the detonation chamber, the "dwell" time of the moving front is necessarily greatest in the external mixer and the connective tubing. It is the Applicant's conviction, based upon experimental evidence to date, that the buildup of residual heat in these external components plays a much greater role than heretofore suspected.

It was apparent, therefore, that significant advantage in the number of shots obtainable from a repetitively fired seismic gas exploder should be possible if the utilization rate of an individual gas inlet and associated external elements were reduced, or, in other words, if cooling time were increased. In order to maintain a given repetition rate for the exploder, it was decided to modify the conventional charging and ignition system to accomplish this result.

SUMMARY OF THE INVENTION

It is therefore a general object of this invention to provide a seismic gas exploder which may be repetitively operated in a more efficient manner.

It is a further object of this invention to provide a seismic gas exploder which may be repetitively operated to produce a long or continuous sequence of pulses without overheating to the point of preignition.

Other objects and advantages of this invention will become apparent from a consideration of the detailed description to follow and of the attached drawings and of the claims hereto appended.

In a preferred embodiment this invention comprises a seismic gas exploder resting on the earth, including a stationary upstanding housing within which a rigid top and a rigid bottom are relatively movable to define an expansible detonation chamber therebetween. A charging and ignition system is provided by means of which the device may be repetitively fired to produce reciprocal movement between the rigid top and the rigid bottom and thus inject a burst of seismic pulses into the earth.

The upstanding wall of the detonation chamber is penetrated by a plurality of spaced apart gas inlets to which separate external gas entry tubes are interconnected. Each such tube is fed from its own mixer and spark ignition means. The mixers are in turn individually supplied from a common source of fuel gas and oxidizing gas with remotely operated solenoid valves to control gas flow.

By sequentially operating the gas flow valves, the chamber is charged with a gas mixture through the separate inlets at timed intervals which may be as short as the recoil and return mechanism of the exploder will permit. Spark ignition is applied to the gas mixture at or adjacent each mixer in timed relation to the valve operation, thus producing the desired series of gas explosion in the detonation chamber. The limiting factor in the number of pulses obtainable in one continuous sequence or burst is the phenomenon of preignition. By lowering the frequency with which each mixer-conduit-inlet channel is employed, i.e., by increasing the number of such channels, the total number of pulses in a rapid fire sequence may be significantly increased without slowing the exploder rate of fire.

DESCRIPTION OF THE PREFERRED EMBODIMENTS

Figure 1:
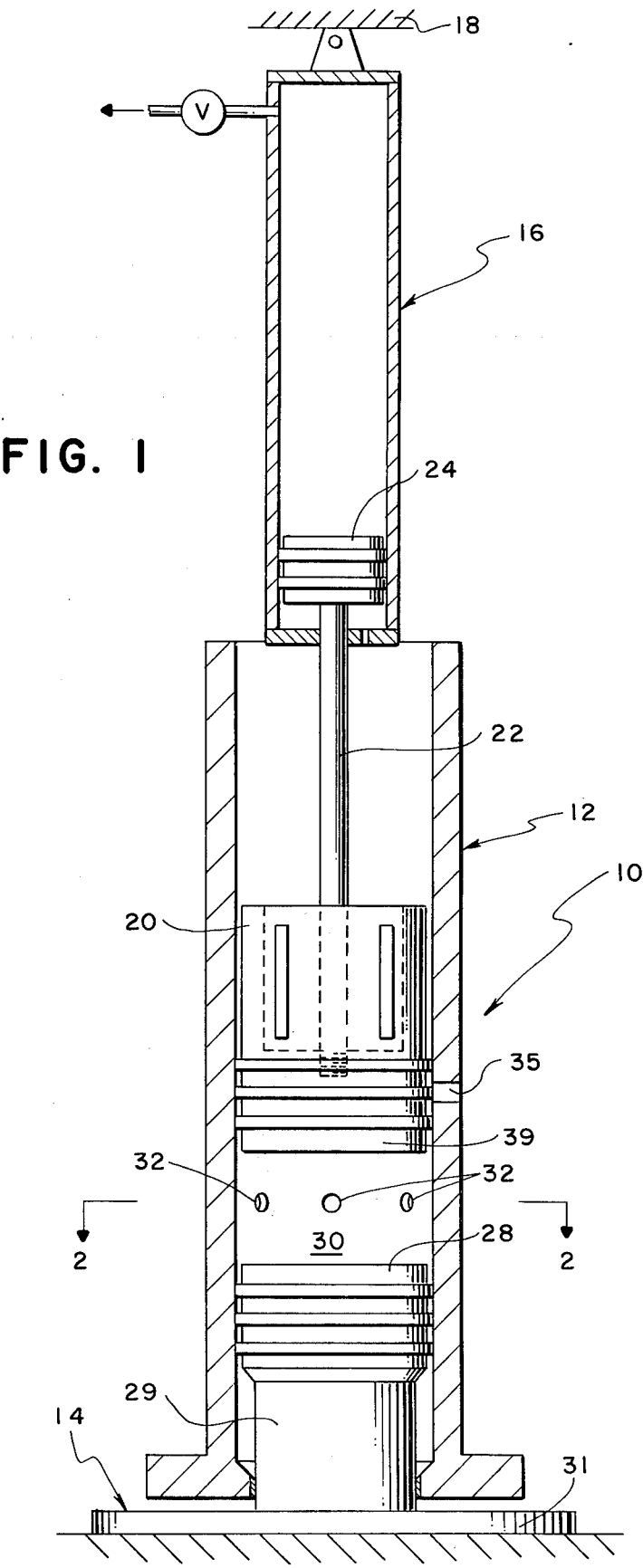
FIG. 1 is a vertical section through a seismic gas exploder in accordance with this invention.

With reference now to FIG. 1, there is shown a gas exploder 10, which may be generally any seismic gas exploder such as, for example, manufactured under the name DINOSEIS (a trademark of the Atlantic Richfield Company). Preferably, the invention will be described as utilized with an exploder of the type more particularly described in Applicant's copending application entitled FAST CYCLE SEISMIC GAS EXPLODER AND METHOD, Ser. No. 740,704, filed Nov. 11, 1976, in the name of Tom P. Airhart. The exploder 10 consists of a stationary upstanding cylindrical housing 12 assembled with a free base 14 (i.e., one that is movable vertically like a piston independent of the housing 12) in contact with the earth and an upper pneumatic recoil and recovery cylinder 16 suspended beneath a fixed overhead support 18, such as a truck body or a free standing framework. Within the cylindrical housing 12, a movable generator piston 20 is carried on a piston rod 22. A control piston 24 is movable within the upper cylinder 16 and is rigidly attached to the upper end of the piston rod 22.

The base 14 consists generally of a base piston 28, a connecting shank 29 and a bottom impact plate 31. The space between the generator piston 20 and the base piston 28 forms an expansible detonation chamber 30.

Figure 2:
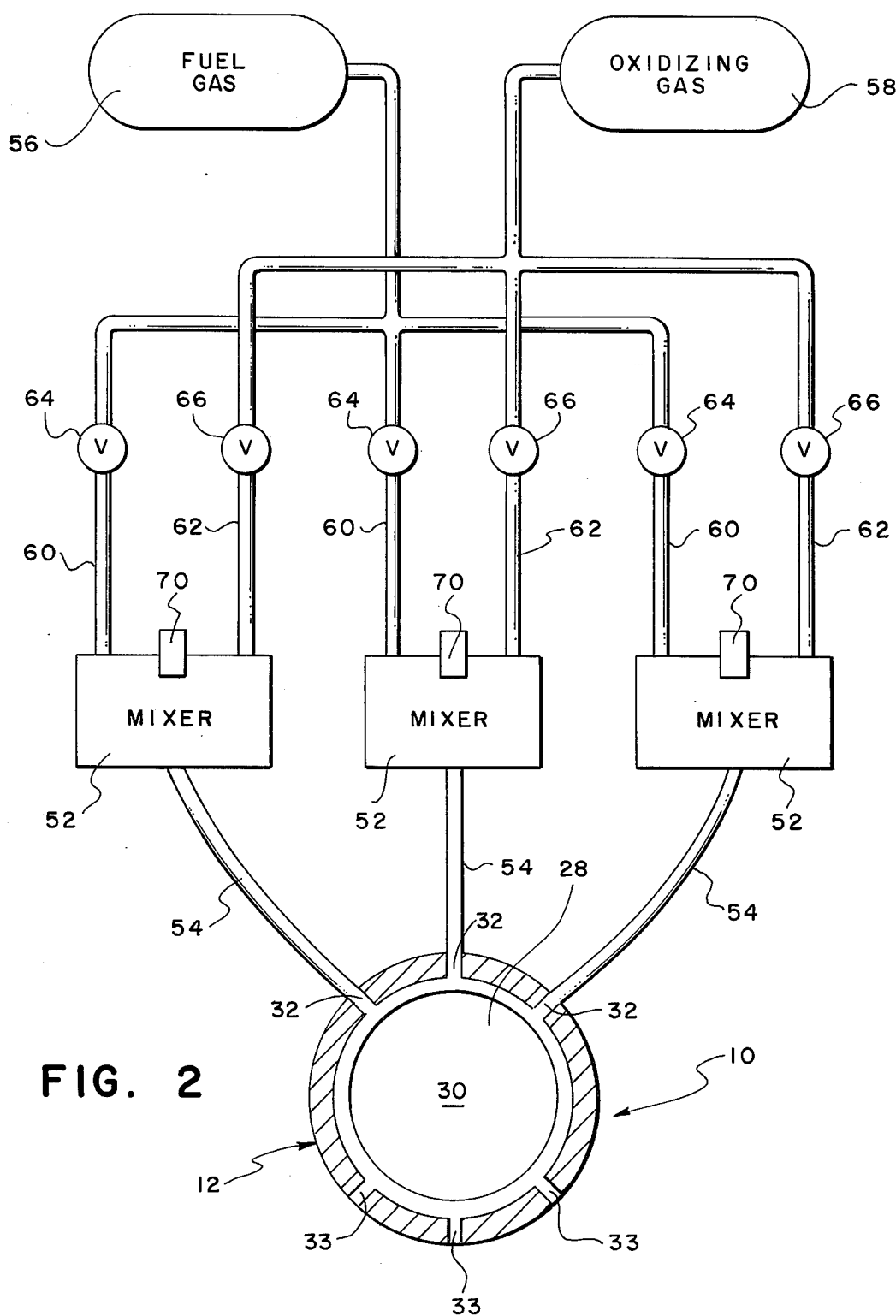
FIG. 2 is in part a sectional view of the exploder taken along the line 2—2 of FIG. 1 and in part a diagrammatic view of a charging and ignition system utilized by this exploder.

As best seen in FIG. 2, the upstanding wall of the housing 12 is penetrated at spaced intervals by a plurality of gas inlets 32 communicating with the chamber 30, preferably at the same level. Positioned approximately opposite the inlets 32 there are a like number of continuously open exhaust vents 33. One or more larger exhaust ports 35 (FIG. 1) penetrate the wall of the housing 12 above vents 33 and are exposed to the detonation chamber 30 only when the control piston 20 is driven sufficiently above its initial rest position.

The inlets 32 are interconnected respectively with separate gas mixers 52 of conventional design by means of like external gas entry tubes 54. In order to obtain fuel gas and oxidizing gas under pressure from sources 56 and 58, each mixer 52 is provided with independent supply lines 60 and 62. By conventional means, not shown, remotely-operable pairs of solenoid-operated flow control valves 64 and 66 determine the flow of fuel gas and oxidizing gas respectively to each of mixers 52. As shown in FIG. 2, spark ignition devices 70 are positioned so that their electrodes communicate with the combustible gas mixture developed by mixers 52. Remote timing means (not shown) are well known whereby the ignition devices 70 may be energized in timed relation to the opening of each pair of valves 64 and 66.

In operation, any one pair of valves 64 and 66 are opened momentarily to feed the associated mixer 52 and thus to provide detonation chamber 30 with a charge of combustible gas mixture through the corresponding gas entry tube 54 and inlet 32. The ignition of the gas mixture in or adjacent such mixer 52 produces a flame front accelerating into a detonation velocity as it progresses along the associated gas entry tube 54 and through linet 32. With detonation in the chamber 30, the base 14 (FIG. 1) transmits a compressional seismic impulse downward to the earth while the pistons 20 and 24 are simultaneously driven upwardly. As described in Applicant's copending application Ser. No. 751,406 referenced above, the recoil and recovery cylinder 18 insures a rapid return of piston 20 to its initial position. As piston 20 returns downwardly, a substantial portion of the spent gases within the chamber 30 are scavenged through the exhaust port 35.

The procedure described above is repeated in succession with each pair of valves 64 and 66, mixer 52, gas entry tube 54 and inlet 32 at timed intervals which may be as short as the recoil and return mechanism of the exploder 10 will permit. If desired, the intervals may, of course, be varied to produce a coded sequence of pulses well adapted to more advanced seismic data acquisition techniques. However, since each inlet 32 and its associated external gas entry tube 54 and mixer 52 are used in rotation with other like elements, their effective rate of utilization is obviously less than the rate of fire of the exploder 10. An experiment was conducted for comparative purposes illustrating the improvement achieved by using multiple inlets 32 and associated external components in accordance with this invention rather than using a single gas inlet. First a seismic gas exploder of the general character described was provided with a single gas inlet to the detonation chamber and rapid fired at 500 millisecond intervals. Significant preignition occurred after only four shots. Next, without other alterations, the same device was provided with a pair of opposed gas inlets separately supplied from independent mixers in accordance with this invention. Preignition was detected after 14 shots at the same exploder rate of fire. This supports the hypothesis that the heating effect which ultimately produces preignition does not occur primarily in the detonation chamber 30 itself but rather in the external components. A further experiment was conducted to determine the amount of cooling time in each individual inlet 32 and associated external mixer assembly required in order to completely eliminate the phenomenon of preignition. It was determined that approximately 5 seconds was required. One may confidently predict therefore that as the number of sequentially utilized and independent gas flow channels into the detonation chamber of a gas exploder is increased the number of shots obtainable at a given rate of fire without preignition increases rapidly. For example, the three channel array shown in FIG. 2 should provide on the order of 36 continuous shots at 500 millisecond firing intervals. Eight separate channels may be easily provided without design difficulty, at which point the number of shots obtainable without preignition should reach values well in the hundreds.

It is important that the mixers 52 should function independently and be independently supplied from sources 56 and 58. If, for example, a single mixer were employed to "feed" multiple inlets 32, it would become necessary to introduce further valving to sequence the connection between the mixer and such inlets. The operation of such further valves would in addition have to be virtually simultaneous with that of the valves 64 and 66. In conventional prior art practice, multiple gas inlets are, of course, operated simultaneously for redundancy from a common manifold and mixer (see, for example, Kilmer, U.S. Pat. No. 3,314,497), which does not present the above-referenced sequencing problem.

The use of this invention is not limited to the firing of a seismic gas exploder 10 having the particular configuration and operation described herein. Any such exploder which is adapted to repetitive operation may be operated to produce significantly longer or even continuous pulse sequences by modifying its charging and ignition system in accordance with this invention.

Although the invention has been described and illustrated with a certain degree of particularity, it is understood that the present disclosure is made by way of example only and that numerous changes in the details of construction and the combination and arrangement of parts may be resorted to without departing from the spirit and scope of the invention as hereinafter claimed.

The embodiments of the invention in which an exclusive property or privilege is claimed are defined as follows.

1. A rapid fire gas exploder for generating an extended sequence of seismic pulses comprising:
   (a) means defining an expansible closed chamber having a rigid bottom adapted to be coupled to the ground and a rigid top movable reciprocally relative to said bottom;
   (b) a plurality of separate fluid conduit means affixed to said chamber in constant communication with the interior thereof;
   (c) a like plurality of separate gas mixers whose outputs are connected respectively to said fluid conduit means externally of said chamber;
   (d) means for supplying fuel gas and oxidizing gas to each of said mixers;
   (e) means for controlling said supply means so that said mixers operate in sequence at a desired rate of fire to provide successive charges of combustible gas mixture; and
   (f) means for spark igniting said charges of combustible gas mixture adjacent each of said mixers in timed relation to the operation of said control means, thereby creating a series of detonations within said chamber at said rate of fire adapted to effect a corresponding reciprocal movement of said rigid top.

2. A device according to claim 1 in which said chamber is formed within a stationary, upstanding housing whose side wall partially encloses said chamber and wherein said side wall is penetrated at spaced apart intervals by inlets joined respectively to said fluid conduit means.

3. A device according to claim 2 wherein said inlets penetrate said side wall at substantially the same height.

4. A device according to claim 3 wherein said gas inlets are three in number.

5. A device according to claim 1 wherein said spark ignition means include a plurality of separate spark plugs having their electrode positioned respectively within each of said mixers.

6. A device according to claim 1 wherein said control means include a plurality of remotely-operable solenoid check valves interposed between each of said mixers and said means for supplying fuel gas and oxidizing gas.

7. A device according to claim 1 wherein said detonation chamber is provided with a plurality of continuously open vent means penetrating the wall of said housing approximately opposite said respective gas inlets.

8. A method of generating an extended series of compressional pulses in the ground at a high rate of fire utilizing a gas exploder with a closed, expansible detonation chamber including a rigid bottom and a rigid top interconnected for limited relative vertical movement therebetween comprising:
   (a) placing said rigid bottom into direct contact with the ground;
   (b) sequentially supplying a plurality of mixers with stoichiometric quantities of fuel gas and oxidizing gas at said rate of fire;
   (c) passing the mixed gases from the respective mixers into said detonation chamber along separate gas flow channels;
   (d) sequentially igniting the mixed gases adjacent said respective mixers at said rate of fire.

9. A method according to claim 8 wherein said rate of fire is at least two pulses per second.

10. A method according to claim 8 wherein said rate of fire is varied in accordance with a pseudo-random sequence.

11. A method according to claim 8 wherein the number of said separate gas flow channels is selected in relation to said rate of fire such that the cooling time for each gas flow channel is at least one second.

12. A method according to claim 11 wherein said cooling time is selected to be at least five seconds.

13. A method according to claim 11 wherein said cooling time is sufficient to render said extended series of pulses substantially continuous.

* * * * *